United States Patent [19]
Hale

[11] 3,819,918

[45] June 25, 1974

[54] ELECTRONIC DEVICE FOR DETERMINING THE HEIGHT, WIDTH, LENGTH AND VOLUME OF A CONTAINER

[75] Inventor: Elgie J. Hale, Ogden, Utah
[73] Assignee: Kratos, San Diego, Calif.
[22] Filed: Mar. 19, 1973
[21] Appl. No.: 342,685

[52] U.S. Cl............ 235/151.3, 250/223 R, 356/158
[51] Int. Cl. ........................................... G01b 11/00
[58] Field of Search.................... 235/151.3, 151.33; 250/223 R, 220 R, 219 WO, 219 LG, 219 D, 219 TH, 218 R, 217 SS; 356/157, 158, 159, 160, 167; 198/39, 40

[56] References Cited
UNITED STATES PATENTS

| | | | |
|---|---|---|---|
| 3,436,540 | 4/1969 | Lamorlette.................. | 250/223 R X |
| 3,513,444 | 5/1970 | Henderson et al.............. | 356/167 X |
| 3,529,169 | 9/1970 | Heaney et al.................. | 356/167 X |
| 3,588,480 | 6/1971 | Unger et al................ | 235/151.33 X |
| 3,682,554 | 8/1972 | Flaczynsky.................. | 250/223 R X |

Primary Examiner—Joseph F. Ruggiero
Attorney, Agent, or Firm—Philip A. Mallinckrodt

[57] ABSTRACT

A device for measuring and recording the length, width, height, and volume of a container as it moves along a conveyor system comprises two rows of photo transistors upon which respective curtains of parallel light rays are directed. The container intersects a portion of each curtain of light as it moves along the conveyor, and an encoder means produces recurring signals corresponding to a preset increment of advancement of the container through the curtains of light. Each signal from the encoder activates means for counting the number of darkened photo transistors in each row thereof at that instant. A computer determines the height, width, length, and volume of the container.

3 Claims, 4 Drawing Figures

ELECTRONIC DEVICE FOR DETERMINING THE HEIGHT, WIDTH, LENGTH AND VOLUME OF A CONTAINER

An encoder means associated with the conveyor produces recurring signal, each signal corresponding to a preset increment of advancement of the container through the device. As the container moves through the curtains of light, it intercepts a portion of the light rays and casts a shadow equal to its height and width on the respective rows of photo transistors. Each signal from the encoder activates a counting means which counts the number of photo transistors in the shadow cast by the container at that instant. Raw data, including the number of shaded photo transistors counted in each row of photo transistors during each counting sequence and the number of recurring signals from the encoder, are introduced into computer means which processes the data and registers and/or displays the height, width, length and volume of the container.

BACKGROUND OF THE INVENTION

1. Field

The invention is concerned with apparatus and methods for measuring the length, width, height and computing the volume of a container or carton as it moves along a conveyor system.

2. State of the Art

All prior efforts to produce a device capable of determining the length, width, and height and also of computing the volume of a container as the container moves along a conveyor system without making any mechanical contact with the container other than that of the conveyor system itself, have, to the knowledge of the inventor, been plagued with severe problems which heretofor have prevented the commercial development of such a device.

One device in the art provided means for directing equal length, parallel light beams transversely of the conveyor system and in a plane normal to and above the longitudinal axis of the conveying surface of the conveyor system. Means were also provided for directing equal length, parallel light beams in a vertical direction between the top surface of the conveyor and an elongate element at some elevation above the top surface of the conveyor, with the vertically directed light beams being in a plane coextensive with the plane formed by the transversely directed light beams. Vertical and horizontal rows of photo resistors were positioned so that the light rays directed transversely of the conveyor and the light rays directed normal to the conveyor impinged on the vertical and horizontal rows of photo resistors respectively.

Means were built into the conveyor system for measuring the advancement of the container. For each preset increment of movement of the container, the photo resistors were checked to determine the resistance of each resistor when connected between a constant voltage. Those photo resistors which exhibited a resistance within a specified range were counted. The number of photo resistors counted in each row for each increment of movement of the container and the number of increments measured as the container moved past the device were introduced and stored in storage registers.

Computer means calculated the volume of each incremental portion of the container by repeated counting of the impulses in the height storage register into a binary coded decimal counter chain. The counting of the impulses in the height storage register into the binary coded decimal counter chain was repeated a number of times equal to the number of impulses in the width storage register. This counting technique was repeated for each increment of advancement of the container.

The device had several severe drawbacks and limitations which actually rendered the device inoperable for commercial purposes. The photo resistors were slow in responding to changes in the amount o light impinging thereon. Thus, the time between individual checks of the photo resistors had to be sufficient for each photo resistor to respond to any change in the amount of light impinging thereon. The container thus had to be moved past the device at a very slow rate, much slower than rates of travel on commercial conveyor systems to obtain a meaningful number of checks along the length of the container. When the container was moved past the measuring device at increased rates, but not yet approaching the rate of travel of conventional commercial conveyor systems, the distance the container moved between measurements, due to the time needed to take the measurement, was so great as to create large errors in the computed value of the volume of the container.

In addition, each photo resistor required its own individual calibration potentiometer. Each potentiometer was subject to miscalibration and other faults which could ultimately result in the creation of errors in the measurements made.

The computation technique, as explained above, required an immense number of repeated countings of data to binary coded decimal notation and was, thus, cumbersome and time consuming. The computation technique itself limited the rate at which the device could accurately measure containers to such an extent that the device was useless in normal conveyor line applications.

SUMMARY OF THE INVENTION

In accordance with the present invention, a dependable measuring device is provided which accurately measures the length, width, and height of cartons or containers and simultaneously computes the volume of the containers as the containers move past the device on a conveyor system. There is no mechanical contact made with the container other than that of the conveyor system itself. The device comprises a rectangular shaped frame whose top, bottom and two side members surround an open space. Containers to be measured are conveyed through the open space in the frame member by conveyor means.

Various components of the device, including a pair of quartz lamp light sources, a pair of parabolic mirrors and two rows of photo transistors, are positioned around the periphery of the frame. The first parabolic mirror is positioned along the top or bottom frame member and the second parabolic mirror is positioned along one of the side members of the frame. The two remaining frame members each have a row of photo transistors mounted thereon. Two quartz lamp light sources are mounted on the frame whereby light from the first light source is directed upon and reflected by the first parabolic mirror and light from the second light source is directed upon and reflected by the second parabolic mirror. The light reflected from each of the parabolic mirrors forms a curtain of equal length, parallel beams. The curtain of light from the first parabolic mirro extends across the open space in the frame and impinges on the row of photo transistors facing the first parabolic mirror, and the curtain of light from the second parabolic mirror extends across the open space in the frame and impinges on the other row of photo transistors, i.e., the row of photo transistors facing the second parabolic mirror.

As a carton or container passes through the open space in the frame, it intersects a portion of the parallel light beams being reflected from each parabolic mirror and casts corresponding shadows on the two rows of photo transistors. A travel sensor and encoder means monitors the travel of the carton through the device. For every predetermined increment of travel, the encoder produces an impulse which initiates a scanning sequence. During the scanning sequence, the number of darkened transistors in each row of photo transistors are counted. The number of darkened transistors in each row of photo transistors corresponds to the height and the width of the container, respectively, for the increment along the length of the container at which the particular count was taken. The numbers corresponding to the height and width of the container for each scanning sequence are multiplied together to produce a signal representative of the volume of the incremental portion of the container or carton.

The scanning, counting and multiplying sequence is repeated for each increment of travel of the container or carton through the device. The incremental volumes are added together to produce a signal representative of the total volume of the container or carton.

The scanning, counting and multiplying sequence can be modified to produce a signal representative of the maximum displaced volume of the container or carton. In such a modification, the number of darkened transistors for each individual row of photo transistors in each scan is stored in a memory unit. The data from all the scans are compared and the signal representing the maximum height and width of the container or carton is isolated. These signals are multiplied together, and the product thereof multiplied by the length of the container as measured by th total number of impulses produced by the travel sensor and encoder as the carton or container passed through the device.

In either modification, the signals representative of the volume, length, width and height of the container or carton are generated in binary notation, and means are provided for converting the signals from binary notation to binary coded decimal notation. The signals in binary coded decimal notation are then introduced into conventional means for registering and/or displaying the length, height, width, and volume of the container or carton.

THE DRAWINGS

The device illustrated in the accompanying drawings represents the best mode presently contemplated of carrying out the invention, although it is recognized that the inventive concepts here taught can be utilized in a variety of specific forms within the scope of the claims.

FIG. 1 is an end elevation of the device;

FIG. 2, a vertical section taken on the line 2—2 of FIG. 1;

FIG. 3, a vertical section taken on line 3—3 of FIG. 2; and

FIG. 4, a schematic diagram of a portion of the electronic circuitry used in the device.

DETAILED DESCRIPTION OF THE PREFERRED EMBODIMENTS

Figure 2:
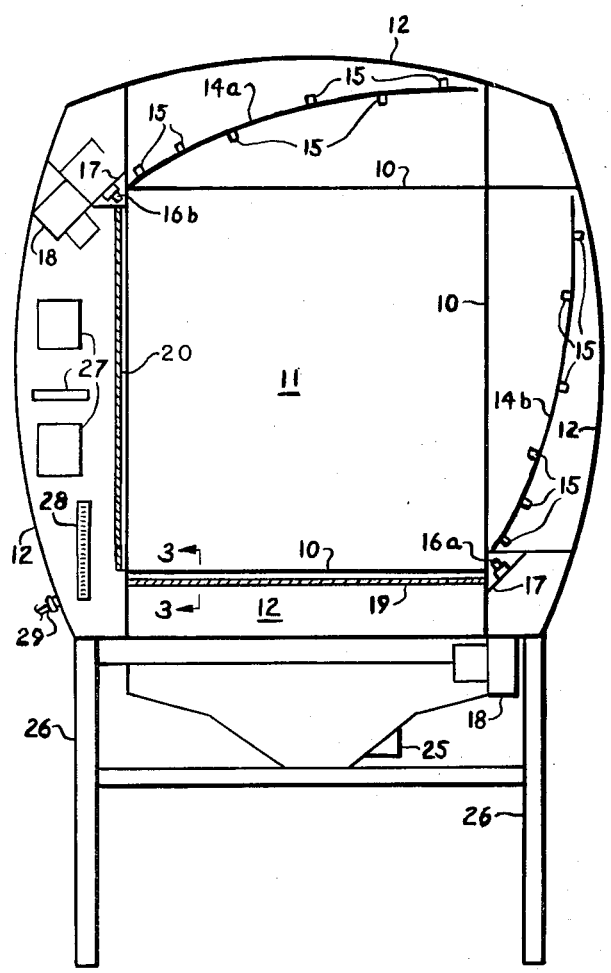
Figure 1:
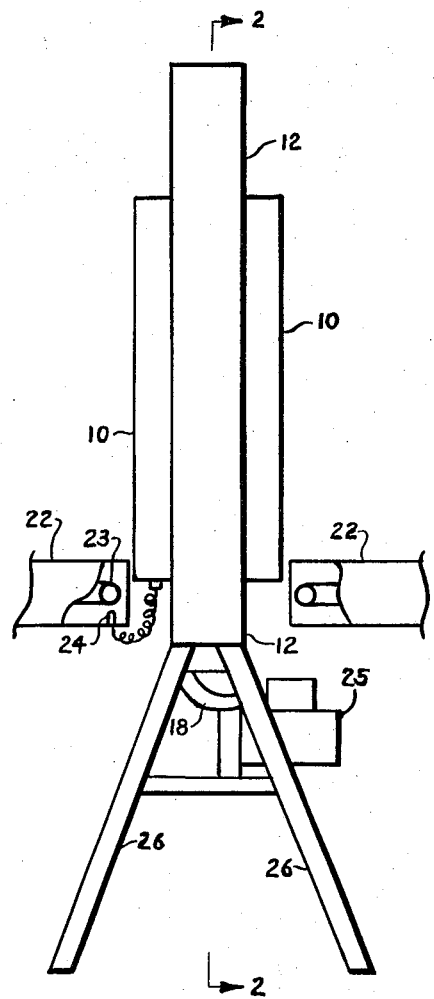
Figure 3:
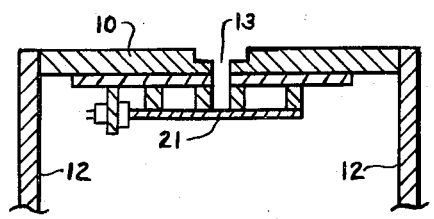

The measuring device illustrated in FIGS. 1–3 comprises a frame member 10 whose inward facing sides define a top, two sides and a botton surface of an open space 11. The frame 10 has attached thereto housing member 12 which encircles the periphery of frame 10 making the assembly one integral unit. Various components of the device are positioned on frame 10 and covered by housing member 12.

The frame member 10 has slots 13, which extend around the periphery of the frame. Slot 13 is shown in FIG. 3 as part of the bottom surface of frame 10. The configuration for slot 13 in the other three sides of frame 10 is identical to that shown in FIG. 3.

Elongate parabolic mirrors 14a and 14b are positioned along the top and one side of the frame 10 respectively. The parabolic mirrors are held in place with brackets 15. Means are provided for directing light from quartz lamps 16a and 16b against parabolic mirrors 14a and 14b respectively. In the embodiment illustrated, each of the quartz lamps 16a and 16b are mounted on the inside of a triangular shaped enclosure 17. The enclosures 17 are positioned adjacent opposite corners of frame 10. Cutout sections in enclosures 17 register with slot 13 in frame 10. Light from quartz lamps 16a and 16b is emitted through the cutout sections of enclosures 17, passes through slot 13 of frame 10 and strikes parabolic mirors 14a and 14b respectively. A blower and baffle system 18 forces air across the enclosures 17 as means for cooling the quartz light sources.

Equal length, parallel light rays are reflected from parabolic mirrors 14a and 14b. Means are provided for directing the equal length, parallel light rays from parabolic mirrors 14a and 14b against the rows of photo transistors 19 and 20. The photo transistors of row 19 are positioned along and in register with slot 13 in the bottom of frame 10, and the photo transistors of row 20 are positioned along and in register with slot 13 in the side of frame 10. In the embodiment shown, the equal length, parallel light rays are reflected by parabolic mirrors 14a and 14b through slots 13 of frame 10 and strike the rows of photo transistors 19 and 20 respectively.

The photo transistors are mounted on an elongate printed circuit board 21 which is in turn mounted along frame 10 as shown in FIG. 3. The photo transistors are placed on very small centers, such as 0.120 inch, along the printed circuit board making it possible to take measurement of extreme accuracy. In a preferred embodiment, 100 photo transistors are mounted on individual printed circuit boards and several printed circuit boards are placed in a line to form the rows 19 and 20 of photo transistors shown in FIG. 2. The printed circuit boards of both rows 19 and 20 are mounted on their respective sides of frame 10 using the configuration as shown in FIG. 3 so that the photo transistors thereon are in alignment and register with slot 13.

A travel sensing and encoder means is provided which produces recurring electronic signals. Each signal corresponds to a preset increment of advancement of the container through the device. The encoder means shown in FIG. 1 is incorporated into the conveyor system 22. A magnet or set of magnets is mounted on the periphery of the edge of roller 23. Adjacent the edge of roller 23 is a magnetic pickup 24 which generates an electrical impulse each time a magnet or roller 23 passes by. The impulse thus produced are fed into electronic circuitry on the printed circuit boards 21 associated with the photo transistors. Alternatively, commercially available encoding devices can be used in place of the magnets and magnetic pick-up shown in FIG. 1. The commercially available devices are connected by suitable drive means, such as a drive belt, to the roller 23. Devices using mechanical switching to generate electrical impulses as well as devices using a rotating member which generates induced electronical impulses in a stationary member can be used.

In FIGS. 1 and 2, there is shown an air blower 25 and associated ducts which blows air over a transparent cover on slot 13 in the bottom of frame 10 thus preventing dirt from accumulating on slot 13 in the bottom of frame 10. As shown, the frame 10 is supported by base 26 at a height compatable with the conveyors 22.

As a carton or container to be measured moves into the open space in frame 10 of the device, it intercepts a portion of the equal length, parallel light rays being reflected from the parabolic mirrors 14a and 14b and casts shadows on the rows of photo transistors. The shadow on row 20 is equivalent to the height of the container or carton, and the shadow on row 10 is equivalent to the width of thee container or carton. Means are provided for counting the number of photo transistors which are in the shadows cast by the container or carton. The counting is repeated for every increment of movement of the container or carton through the device as measured by the encoder means. The counting of shaded transistors is done electronically, and the circuitry used in a preferred embodiment, i.e. were 100 transistors are mounted on individual circuit boards and the circuit boards placed in line to form the rows 19 and 20 of photo transistors, will be described with reference to FIG. 4 wherein a schematic diagram of a portion of the circuitry for one printed circuit board is illustrated.

Figure 4:
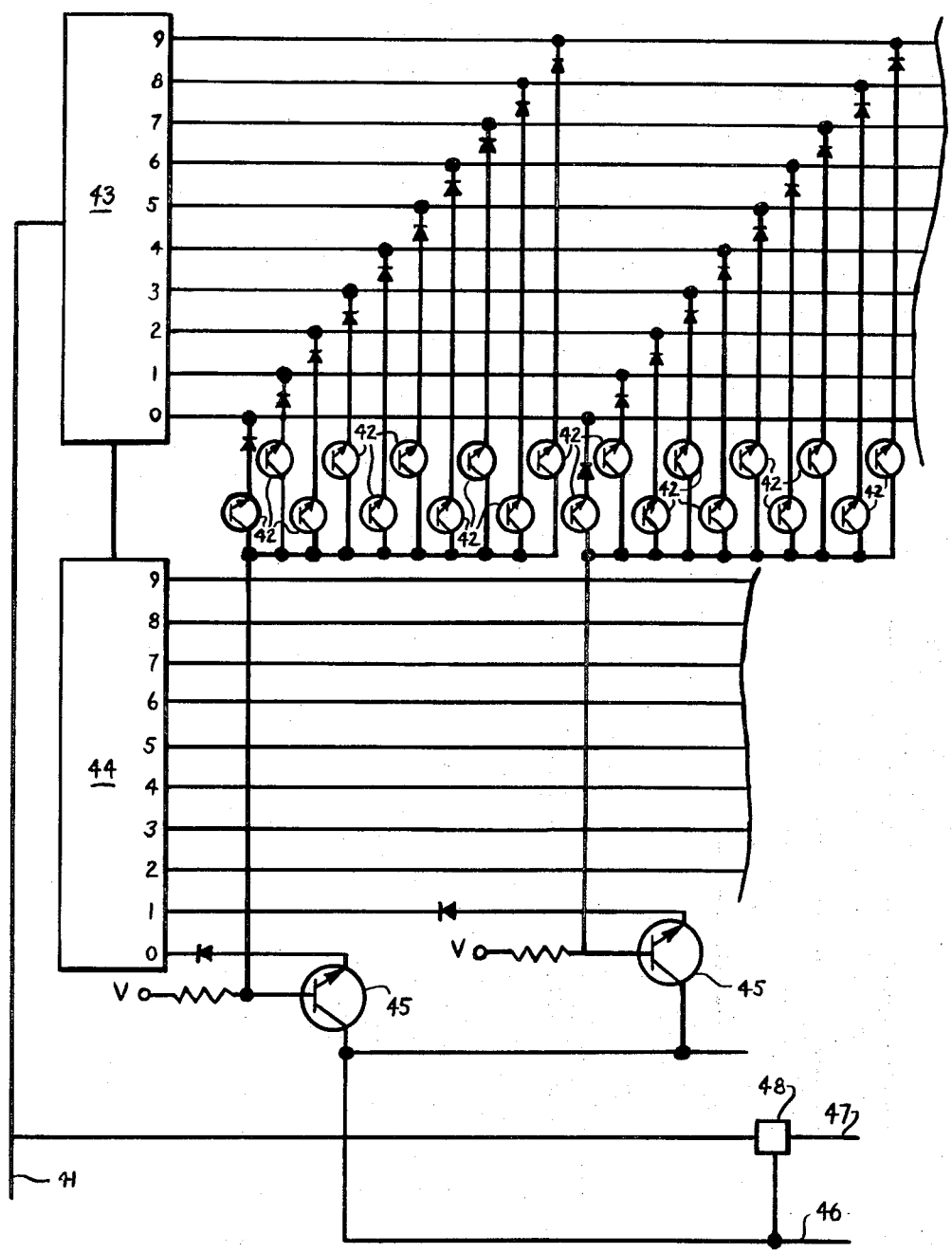

Referring to FIG. 4, the signal 41 from the encoding means is introduced into module 43 to enable the counting cycle. The photo transistors 42 on the printed circuit board are arranged in groups of ten with the emitter of the first photo transistor in each group of ten being connected to the O position of module 43, the emitter of the second phototransistor in each group of ten being connected to the 1 position of module 43, with the emitters of the third, fourth, and up to tenth photo transistors in each group of ten being similarly connected to the 2, 3, and up to 9 position of module 43 respectively. There are ten groups of ten transistors on each circuit board (there are only two groups of ten transistors each shown in FIG. 4).

The photo transistors 42 in each group of ten photo transistors are connected with their collectors in series with each other and then to the base of a common transistor 45. The emitter of transistor 45 for the first group of the transistors being connected to the O position, the emitter of the transistor 45 of the second group of ten transistors being connected to the 1 position, etcetera until the emitter of the transistor 45 of the tenth group is connected to the 9 position of module 44. A constant voltage V and a resistor are connected in parallel with each group of ten transistors to the base common transistor 45. The photo transistors 42 are connected such that a current flows from voltage source V to module 43 when the photo transistor is activated by a light source. Each printed circuit board in both rows 19 and 20 contains the circuitry shown in FIG. 4 with the possible exception of modules 43 and 44. Modules 43 and 44 can be included on each printed circuit board, or the circuits on each individual circuit board could be connected to a common set of modules 43 and 44.

The signal 41 activates module 43 to cycle from positions 0 to 9 and to repeat the cycle. Module 44 is also activated and cycles from 0 to 9 once for every 10 cycles of module 43. While module 44 is in its 0 position, module 43 cycles from its 0 to 9 position. Thus, each photo transistor in the first group of 10 photo transistors is checked one at a time. A current will flow from voltage source V to module 43 for each transistor that has light impinging thereon. The current flow results in a low voltage being impressed on transistor 45, and transistor 45 remains in its off position preventing current flow in line 46. Thus, no pulse is produced in line 46 when a transistor having light impinging thereon is checked. Each photo transistor which is shaded will not permit a current to flow therethrough, and the full voltage from voltage source V is impressed on transistor 45. The impressed voltage activates transistor 45 to its on position allowing current to flow in line 46. Thus, a pulse is produced in line 46 every time a shaded photo transistor is checked.

After all ten photo transistors in the first group have been tested, module 44 cycles to its 1 position and module 43 recycles from its 0 position to its 9 position. By repeating the cycling process of module 43 ten times, one cycle for each position of moudle 44, each of all 100 photo transistors is individually checked to determine if it is exposed to or shaded from the quartz light source 16a and 16b. Each shaded photo transistor produces a pulse in line 46 as explained above. The pulses from line 46 for each of the printed circuit boards in row 19 are added together producing the total number of darkened photo transistors in row 19. The pulses from line 46 for each of the printed circuit boards of row 20 are similarly added together to produce the total number of darkened photo transistors in row 20.

For each increment of travel of the container or carton, as measured by the encoder means, a new counting cycle is initiated, and all of the photo transistors checked. Thus, for each pulse from the encoder means, the total number of photo transistors from row 19 which are shaded, and the total number of photo transistors from row 20 which are shaded are counted. The numbers obtained from each counting sequence are fed forward to memory and computer means.

As the carton or container passes through the device, at least some position of the photo transistors in each of rows 19 and 20 will be shaded. For each pulse from the encoder means, corresponding pulses will be created in line 46. The length of the box can, accordingly, be obtained by counting the number of consecutive pulses from the encoder means for which there were corresponding pulses produced in line 46. This is readily accomplished by feeding the signals 41 from the encoder means and the pulses in line 46 to module 48. Module 48 screens each pulse from the encoder means and transmits forward only those pulses for which a corresponding pulse in line 46 is obtained. The transmitted pulses from module 48 are forwarded to the memory and computer means. When the carton or container has passed completely through the device, the pulse from the encoder means fails to produce corresponding pulse in line 46 and the computer means is notified that the container has been measured. The computer then processes the data obtained and forwards the computed data to means for registering and/or displaying the height, width, length and volume of the container or carton.

In one mode of operation, the modules 43 and 44 of FIG. 4 continuously check for shaded photo transistors. When there is no container or carton being measured, the scanning operation initiated by modules 43 and 44 fails to produce pulses in line 46, and thus, module 48 prevents the signal from the encoder being forwarded to the computer. When a container enters the measuring device, the scanning circuitry checking the photo transistors respond with pulses in line 46 which are forwarded to the memory and computer means. Module 48 also forwards the pulses from the encoder to the memory and computer means. When the container or box moves through the device, the pulses in line 46 cease. Module 48 accordingly ceases transmitting pulses from the encoder. The cessation of pulses from module 48 is used as a signal to the memory and computer means that the measuring steps have been completed. The computer means then processes the data obtained. Modules 43 and 44 remain continuously operating awaiting the next carton or container.

In an alternate embodiment, a sensing element, such as a light sensor, is placed in the conveyor means directly ahead of the measuring device. When the carton or container moves toward the measuring device, the sensing element initiates the cycling operation of modules 43 and 44. At the end of the measurement, module 48 or the computer means sends a signal to modules 43 and 44 suspending their operation until another carton or container again activates the sensing element in the conveyor.

In FIG. 2, the memory and computing means 27 are shown mounted on frame 10 and housed in housing 12. A terminal strip 28, as shown in FIG. 2, receives the signals from each of the printed circuit boards 21 containing the photo transistors and directs the signals to the appropriate components in the memory and computer means 27. A cable connection 29 supplies electrical power to the device and can also be used to forward the computed data from the memory and computer means 27 to conventional registering and/or displaying means which are not shown in the drawings. Instead of coupling the memory computer means 27 to the registering and displaying means by cable connection 29, optical couplers can be used which provide electrical isolation between the units. Coupling can also be accomplished through current sensing line drivers and receivers which also provide for isolation between the units.

In an alternate embodiment, the memory and computer means 27 are located in a console which is separate and apart from the frame 10. In such an embodiment, the signals from the printed circuit boards are fed from frame 10 to the console through cable connection 29 or the other couplers as mentioned hereinbefore.

In the device of this invention, the data is obtained in pure binary notation and the computations are made using pure binary notation. The computed values of the volume of the container and the measured values of the height, width and length are converted to binary coded decimal notation, whereby conventional registering and/or display means, which operate on binary coded decimal notation, can be utilized in registering and/or displaying these values. The method of converting the pure binary numbers to binary coded decimal notation must not be time consuming and cumbersome. A novel method has been found for this conversion which requires a minimum of equipment and allows nearly instantaneous conversion.

According to this invention, the pure-binary numbers are converted to binary coded-decimal numbers by means of comprising: (1) a reentrant shift register whose register is divided into sections with each section having 4 positions and each position capable of holding one binary digit, the first section being the 4 positions to the far right of said register and the last section being the 4 positions to the far left of said register, (2) a sensor and (3) an adder. The binary number signals are stored in the shift register. The shift register shifts the signals to the right until the three most significant digits of the binary number occupy the first three positions in the shift register. The three digits are isolated and forwarded to a sensor. The sensor analyzes the three digits. If the three digits represent a binary number equal to 4 or less, the three digits are returned to their respective positions in the shift register. If the three digits represent a binary number greater than 4, the three digits are transferred to the adder. A binary three is added to the three digits resulting in a four digit binary number. The four digit binary number is then forwarded to the first section of the shift register. The shift register then shifts the signals contained therein, including the four digits in the first section thereof, one position to the left. The digits in the first section of the shift register are isolated and forwarded to the sensor. The sensor analyzes the four digit number. If the 4 digits represent a binary number greater than 4, the four digits are transferred to the adder where a binary three is added to the four digits. The binary number resulting from this addition is reentered in the shift register in the first section thereof. The second, third and subsequent sections of the register are each in turn isolated and analyzed by the sensor. If the 4 digit binary number of each section being analyzed is equal to or less than binary 4, that section is reentered in its respective position in the shift register. If the 4 digit binary number of any section being analyzed is greater than binary 4, the 4 digits thereof are forwarded to the adder where a binary three is added to the 4 digits. The binary number resulting from this addition is then reentered in its corresponding section of the shift register. After all sections of the register have been analyzed and those whose 4 digits are greater than binary 4 have had a binary three added thereto, the shift register again shifts the signals contained therein one more position to the left. The four digits of each of the sections of said shift register are again analyzed by the sensor, and if the four binary digits of each section represent a binary number equal to 4 or less, the four digits are reentered in their respective section of said shift register. If the four digits represent a binary number greater than 4, the four digits are transferred to the adder where a binary three is added to the four digits. The binary number resulting from this addition is then reentered in its corresponding section of the shift register. This step wise shifting of said shift register by one position at a time to the left, followed by analyzing each section of said register and adding a binary three to any section whose four digit number is greater than four, is repeated until the least significant digit of said binary number is in the first position of said shift register. All the sections of the register corresponding to such a position are again analyzed and a binary three added thereto if the four digit binary number thereof is greater than binary four. The signals remaining in the register of the shift register after this final shift and analysis has been made represents the binary coded decimal number equivalent of the original binary number.

where as this invention is here described and illustrated with respect to certain forms thereof, it is to be understood that other variations within the scope of the following claims are possible.

I claim:

1. A device capable of sensing and recording the length, width, height and volume of a container as the container passes through said device on a conveyor system, said device comprising:

a rectangular frame member having a top, two sides and a bottom and being open at its ends;

means for conveying a container through said frame member at a preset velocity;

a first and second row of photo transistors with the first row of photo transistors mounted on the bottom or top of said frame member and the second row of photo transistors mounted on one of the side of said frame member;

two elongate, parabolic mirrors with the first parabolic mirror mounted along the top or bottom of said frame opposite said first row of photo transistors and the second parabolic mirror mounted along the side of said frame opposite said second row of photo transistors;

a first and second quartz light source and means for directing the light produced by said first quartz light source against the first parabolic mirror and means for directing the light produced by said second quartz light source against the second parabolic mirror whereby the light reflected by said parabolic mirrors is in equal length, parallel light rays;

means for directing said equal length, parallel light rays from said first parabolic mirror against said first row of photo transistors and means for directing said equal length, parallel light rays from said second parabolic mirror against said second row of photo transistors;

means for cooling said quartz light ources;

a travel sensor and encoder means which produces recurring signals, each signal corresponding to a preset degree of advancement of said container through said frame;

electronic circuitry means for testing each photo transistor in said first and second rows of photo transistors for its current conducting characteristics every time said encoder produces a signal;

means for detecting and holding in memory the number of photo transistors in each of said first and second rows of photo transistors which will fail to conduct a test current during said testing, whereby the number of photo transistors in said first and second rows of photo transistors, respectively, which failed to conduct said test current are representative of the width and height respectively of the portion of the container directly over said first row of photo transistors at the time of each test;

means for detecting and holding in memory the number of pulses produced by said encoder during which there were continuous detection of photo transistors which failed to conduct said test current, said number of pulses being representative of the length of the portion of said container which has passed over the first row of photo transistors;

means for multiplying the signal representative of the instantaneous height of said container by the signal representative of the corresponding instantaneous width of said container and multiplying the product thereof by the signal representative of the distance advanced by said container between consecutive pulses of said encoder to produce a signal representative of the incremental volume of said container;

means for adding the signals representative of the incremental volumes to produce a signal representative of the total volume of said container; and means to register or display the computed volume of said container.

2. A device as claimed in claim 1, wherein means are provided for registering or displaying the measured length, width and height of the container.

3. A device as claimed in claim 2 wherein the data corresponding to the length, width, height and volume are generated and held in memory in the form of pure binary numbers, the pure binary numbers are converted to binary coded decimal numbers which in turn are converted to decimal numbers in said means for registering and displaying the computed values, said binary numbers being converted to binary coded-decimal numbers by means of comprising (1) a reentrant shift register whose register is divided into sections with each section having 4 positions and each position capable of holding one binary digit, the first section being the 4 positions to the far right of said rigister and the last section being the 4 positions to the far left of said register, (2) a sensor and (3) and adder, wherein said binary number signals are stored in said shift register, said shift register shifts said signals to the right until the three most significant digits of said binary number occupy the first three positions in said shift register, said three digits are then removed from said shift register and forwarded to said sensor, the sensor analyzes said three digits, if the three digits represent a binary number equal to 4 or less, the three digits are returned to their respective position in said shift register, if the three digits represent a binary number greater than 4, the three digits are transferred to said adder where a binary three is added to the three digits resulting in a four digit binary number, the four digit binary number is then forwarded to the first section of said register in said shift register, the shift register then shifts the signals contained therein including the four digits in the first section thereof one position to the left, the digits in the first section of the shift register are removed and sent to said sensor, the sensor then analyzes the four digit number, if the 4 digits represent a binary number equal to 4 or less, the 4 digits are returned to their respective positions in said shift register, if the 4 digits represent a binary number greater than 4, the 4 digits are transferred to said adder where a binary three is added to the four digits, the binary number resulting from this addition is reentered in said shift register in the first section thereof, the second, third and subsequent sections of said register are each in turn removed from said shift register and sent to said sensor, the sensor then analyzes each section in turn, if the 4 digit binary number of each section being analyzed is equal to or less than binary 4, that section is reentered in its respective position in said shift register, if the 4 digit binary number of any of said sections being analyzed is greater than binary 4, the 4 digits thereof are forwarded to said adder where a binary three is added to the 4 digits, the binary number resulting from this addition is then reentered in said shift register in its corresponding section, after all sections of said register have been analyzed and those whose 4 binary digits are greater than binary 4 have had a binary three added thereto, the shift register again shifts the signals contained therein one more position to the left, the four digits of each of the sections of said shift register are again analyzed by said sensor and if the four binary digits of each section represent a binary number equal to 4 or less, the four digits are reentered in their respective section of said shift register, if the four digits represent a binary number greater than 4, the four digits are transferred to said adder where a binary three is added to the four digits and the binary number resulting from this addition is then reentered in the corresponding section of said shift register, this shift wise shifting of said shift register by one position at a time to the left, followed by analyzing each section of said register and adding a binary three to any section whose four digit number is greater than four is repeated until the shift register hao shifted to where the least significant digit of said binary number is in the first position of said shift register and all the sections of said register corresponding to such a position have been analyzed and had a binary three added thereto if the four digit binary number theeof is greater than binary four, the signals remaining in the register of said shift register after this final shift and analysis has been made represents the binary coded decimal number equivalent to the original binary number.

* * * * *